United States Patent [19]

Schiffner

[11] 4,259,016

[45] Mar. 31, 1981

[54] INTERFEROMETER WITH A SINGLE-MODE WAVEGUIDE COIL

[75] Inventor: Gerhard Schiffner, Munich, Fed. Rep. of Germany

[73] Assignee: Siemens Aktiengesellschaft, Berlin & Munich, Fed. Rep. of Germany

[21] Appl. No.: 2,615

[22] Filed: Jan. 11, 1979

[30] Foreign Application Priority Data

Jan. 31, 1978 [DE] Fed. Rep. of Germany ....... 2804103

[51] Int. Cl.$^3$ .............................................. G01B 9/02
[52] U.S. Cl. .................................... 356/350; 356/351
[58] Field of Search ................................ 356/350, 351

[56] References Cited

U.S. PATENT DOCUMENTS

4,135,822  1/1979  Ezekiel .................................. 356/350

OTHER PUBLICATIONS

"Ring Interferometer 950 m Long," Vali and Shorthill, Applied Optics, vol. 16, No. 2, 2/77 p. 290.

*Primary Examiner*—Craig E. Church
*Attorney, Agent, or Firm*—Hill, Van Santen, Steadman, Chiara & Simpson

[57] ABSTRACT

An interferometer with single-mode optical waveguide wound in a coil which waveguide has a surface at each end for the acceptance of light into the waveguide and for the display of light in the waveguide characterized by at least one polarizing filter being arranged in the path of light emerging from each end surface of the waveguide. Preferably, the interferometer includes a light source such as a laser, at least one beam dividing element which is arranged in the path of a light beam and a coupling arrangement for coupling the light of one of the partial beams into one of the end surfaces and the other partial beam into the other end surface. While the interferometer utilizes a device for detecting the superimposed images of the light exiting both end surfaces of the waveguide, preferably two devices are utilized which can be either a screen or a light sensitive element such as a photo diode.

19 Claims, 5 Drawing Figures

INTERFEROMETER WITH A SINGLE-MODE WAVEGUIDE COIL

BACKGROUND OF THE INVENTION

1. Field of the Invention

The present invention is directed to an interferometer with a single-mode optical waveguide wound in a coil which waveguide has a surface at each end for accepting light into the waveguide and for displaying light traveling in the waveguide.

2. Prior Art

Interferometers, which utilize a single-mode waveguide such as a fiber wound in a coil are known and described in an article by V. Vali, R. W. Shorthill and M. F. Berg, "Fresnel-Fizeau Effect in a Rotating Optical Fiber Ring Interferometer", *Applied Optics,* Vol. 16, No. 10, October 1977, pp, 2605-2607. These interferometers can be applied with the explanation of the Sagnac-effect for the measurement of angular velocities. To that end, linearly polarized light is coupled into the waveguide by its acceptance surface so that light travels in the guide in both directions. By means of superimposing the light emerging from the two ends or display surfaces of the fiber, an interference pattern can be generated whose proportional intensity distribution produces information concerning the movement state of the coil relative to an inertial system. The positional distribution of the light intensity is a function of the mutual phase amplitude of the light rays emerging from the light display or end surfaces of the waveguide. If the coil is at reset with respect to the inertial system, then the transit time of the two light beams traveling in the fiber in opposite directions are exactly equal since no non-reciprocal effects occur in the waveguide. If the coil turns in relation to the inertial system, then because of the relative Sagnac-effect, which is explained by an article by E. J. Post, "Sagnac Effect", *Reviews of Modern Physics,* Vol. 39, No. 2, April 1967, pp. 475-493, a transit time difference, which is different from zero, occurs and the phase amplitude of the light beams emerging from the display surfaces of the fiber are no longer the same. By evaluating the positional intensity distribution in the superposition range of the light beams, rotational velocity of the coil can be determined. Single-mode waveguides are used because a straight forward light path is provided therein. A single-mode waveguide is understood to be a waveguide which conducts or can only conduct a single mode of light.

In such interferometers, the problems occurs that the single-mode waveguide in general alters the polarization state of the beam of light in an unpredictable manner. Therefore, a complete interference of the superimposing light beams is prevented.

SUMMARY OF THE INVENTION

The object of the present invention is to improve the interferometer of the type which utilizes a coiled single-mode waveguide such as a fiber by overcoming the problems with the waveguide or fiber altering the polarization state of the light passing therein.

To accomplish these objectives, the present invention is directed to an improvement in an interferometer with an optical single-mode waveguide wound into a coil, said waveguide having a surface at each end for accepting light into the waveguide and for displaying light traveling in the waveguide. The improvement comprises at least one polarizing filter being arranged in the path of the light emerging from each of said surfaces of the waveguide. With this solution, disturbing effects, which occur due to depolarization of the polarized light beam which is coupled into the waveguide, can be eliminated in the components of the light emitted from the ends of the waveguide so that those portions of the light which no longer demonstrate a state of polarization are filtered out by means of the polarizing filter.

An advantage of the preferred embodiment of such an interferometer is characterized by a light source for generating a light beam, at least one beam dividing element arranged in the light beam for dividing the light beam into two partial beams, means for coupling one of the partial beams into one end surface of the waveguide and for coupling the light of the other partial beam into the other end surface of the waveguide. The polarization filters or polarizing filters are preferably arranged in the beam path of the partial beams which are being coupled into the fiber. In the preferred embodiment, the light source preferably generates at least a partially coherent light and preferably the light source comprises a laser.

In the preferred embodiment, at least one additional beam dividing element is arranged in the beam path of the light from the light source. In an embodiment of the interferometer, each of the beam dividing elements can be selected from a group consisting of beam divider mirrors or beam spliting cubes.

In another embodiment of the interferometer, the beam dividing element is constructed as an optical directional coupler. In this embodiment, if an additional beam dividing element is present, it is also constructed as an optical directional coupler.

In the preferred embodiment, the coupling installation also includes means for purely real imaging of the light source on the end surfaces of the optical waveguide fiber and this means includes imaging objects and means for providing a magnified observation of the surface or surfaces in which the light is being coupled into and coupled out.

With the various embodiments of the interferometer as proposed above, difficulties, which are due to the interference of the partial beams emerging from the end surfaces of the single-mode optical waveguide fiber with one beam being depolarized, can be avoided. Traditional or known ring interferometers of the type mentioned hereinabove can be easily and simply remodeled or modified into the proposed interferometers by means of insertion of one or more polarizing filters. In additional to this minimal change from a constructional point of view in comparison with the prior art interferometers, the expenditure for the mechanism of the device can be greatly reduced by means of using optical direction couplers and represents a modern solution.

DESCRIPTION OF THE PREFERRED EMBODIMENTS

Figure 1:
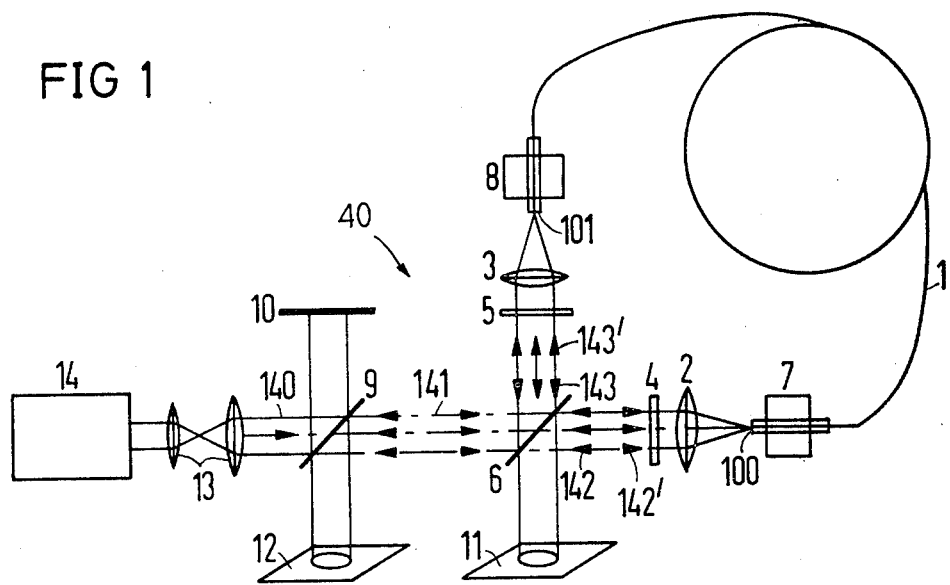
FIG. 1 is a diagrammatic view of a basic design of the interferometer in accordance with the present invention.

The principles of the present invention are particularly useful in an interferometer generally indicated at 40 in FIG. 1.

The interferometer 40 includes a light source 14, which preferably generates a coherent linear polarized light and is preferably a laser. The light from the source 14 is received by a lens system 13, which, as illustrated, consists of two collector lenses, and the lens system 13 changes the output of the source 14 to a light beam 140 with a suitable diameter. The light beam 140 is directed at a beam dividing element or divider 9 whereby a part of the light is coupled out and applied to a light absorber 10. A portion 141 of the light beam passes through the divider 9 and arrives at a beam divider or dividing element 6 and is divided up into two partial beams 142' and 143' of about equal power.

The partial beam 142' is focused by a lens 2 onto an end surface 100 of a single-mode optical waveguide fiber 1, which is wound into a coil of a prescribed number N of windings of a prescribed radius R. The other partial beam 143' is focused by a lens 3 into the other end surface 101 of the fiber 1. Each of the end surfaces 100 and 101 are held in an adjustable mounting device 7 and 8, respective. Each of the end surfaces 100 and 101 are light acceptance surfaces and also act as display surfaces for displaying light traveling in the fiber 1.

The lenses 2 and 3 expediently have the same focal length and micro-objectives are preferably used. The lens 13 together with the lenses 2 and 3 form an imaging optic of means by which the light source is image purely real on the light acceptance surfaces 100 and 101 of the light waveguide.

The coupled in light beam travels in the coiled single-mode waveguide fiber 1 in opposite directions and reemerges through light display surfaces at each end 100 and 101 of the waveguide as partial beams 142 and 143. The beam path of the emerging light is fixed and the beam again arrives via the lenses 2 and 3 at the beam dividing element 6 where the partial beams 142 and 143 are brought into superposition. A part of the beam 142 and 143 proceeds to a light receiving surface or screen 11 while the other part proceeds in the direction of the source and a part of this is split and projected onto a light receiving surface or screen 12 by the beam divider 9. In FIG. 1, beam divider mirrors are used as the beam dividing elements 6 and 9. However, beam splitting cubes could also be utilized. The waveguide 1 is a single-mode waveguide and preferably consists of a glass fiber.

Depending on how sharp the light source is defined on the light surfaces at the ends 100 and 101 of the fiber 1, respectively, i.e. depending on the selection of the interval of the lenses 2 and 3 relative to the ends 100 and 101 of the fiber 1, a system of concentric circular fringe patterns or a uniform brightness distribution can be obtained on the screens 11 and 12. Preferably, the positional intensity distribution of the screens 11 and 12 are complimentary to one another. The division of the light intensity between the beams which proceed to the screen 11 and to the light source depend on the reciprocal phase attitude of the beams emerging from the light display surfaces at the ends 100 and 101, respectively. When the coiled waveguide 1 is at rest in comparison to the inertial system, the transit time of the beams proceeding through the waveguide 1 in opposite directions are exactly alike since no non-reciprocal effects have occured in the waveguide 1. For this reason, the two beams emerging from the waveguide and striking the beam dividing element 6 have the same phase attitude. When the coiled waveguide 1 is placed in rotation in comparison to the inertial system, then as already mentioned because of the relativistic Sagnac-effect, a transit time difference, which is different from zero, occurs and the phase attitude of the two beams striking the beam dividing element 6 is no longer the same. By evaluating the intensity change of the light proceeding to the screen 11 and to the screen 12 or to the source, respectively, as has likewise been initially mentioned, the rotational velocity of the coil can be determined.

In the measurement, however, difficulties arise because most single-mode waveguides unpredictably change the beam of polarized light, which was coupled into the waveguide; for example, linear polarized light is changed in such a manner that in general, elliptical polarized light occurs (cf. A. Simon and R. Ulrich, "Evolution of Polarization Along a Single-Mode Fiber", *Applied Physics Letters*, Vol. 31, No. 8, Oct. 15, 1977, pp. 517–520). For the superposition of the two light beams emerging from the light display surface at the ends 100 and 101, respectively, on the beam dividing element 9 and for obtaining a definite interference, it is necessary to again have at one's disposal light with the same polarization state as the light being coupled into the waveguide. When linear polarized light is being used, this means that the light emitted from the waveguide must likewise be linearly polarized and indeed polarized in a direction parallel to the direction of vibration of the light being coupled into the fiber.

This condition can be fulfilled when one or more polarizing filters are arranged in the beam path of the light emerging from the light display surface at the ends 100 and 101, respectively. In FIG. 1, polarizing filters 4 and 5 are arranged in the partial beam path 142 and 143, respectively, with filter 4 for the beam path 142 and filter 5 for beams 143. As illustrated in FIG. 1, the beam path for the emerging light essentially corresponds to the beam paths 142' and 143', respectively, with the difference that the direction of propagation is in the opposite direction. Thus, in the embodiment of FIG. 1, the polarization filters 4 and 5 are arranged in the beam paths of the light emerging from the waveguide 1 which is essential and also in the path of the light beam accepted by the ends of the fiber. In order to achieve the polarization state of the emerging light striking the beam divider element 6 coinciding with the polarization state of the entering light, the two polarizing filters 4 and 5 need only be selected to be of the same type and be correspondingly oriented. If linearly polarized light is to be coupled into the fiber 1, only linearly polarized filters are to be used and are oriented parallel to the polarization direction of the light to be coupled into the fiber. This is only a specific case. In general, elliptically polarized light or circular polarized light can also be used.

Although it is expedient in the embodiment according to FIG. 1 to work with a light source, which already generates polarized light, this is not necessary. By means of the arrangement of filters 4 and 5 in FIG. 1, light to be coupled into the fiber is also polarized. By means of the arrangement of the polarizing filter and the beam path of the light emerging from the waveguide 1, a complete interference of these beams can be achieved.

The possibility exists that the waveguide coil will rotate the polarization direction by nearly 90°. In this case, an almost complete extinction would occur. The probability of this occurring, however, is extremely small. This problem can be relieved, for example, by means of either winding the waveguide or shortening the waveguide length.

Figure 2:
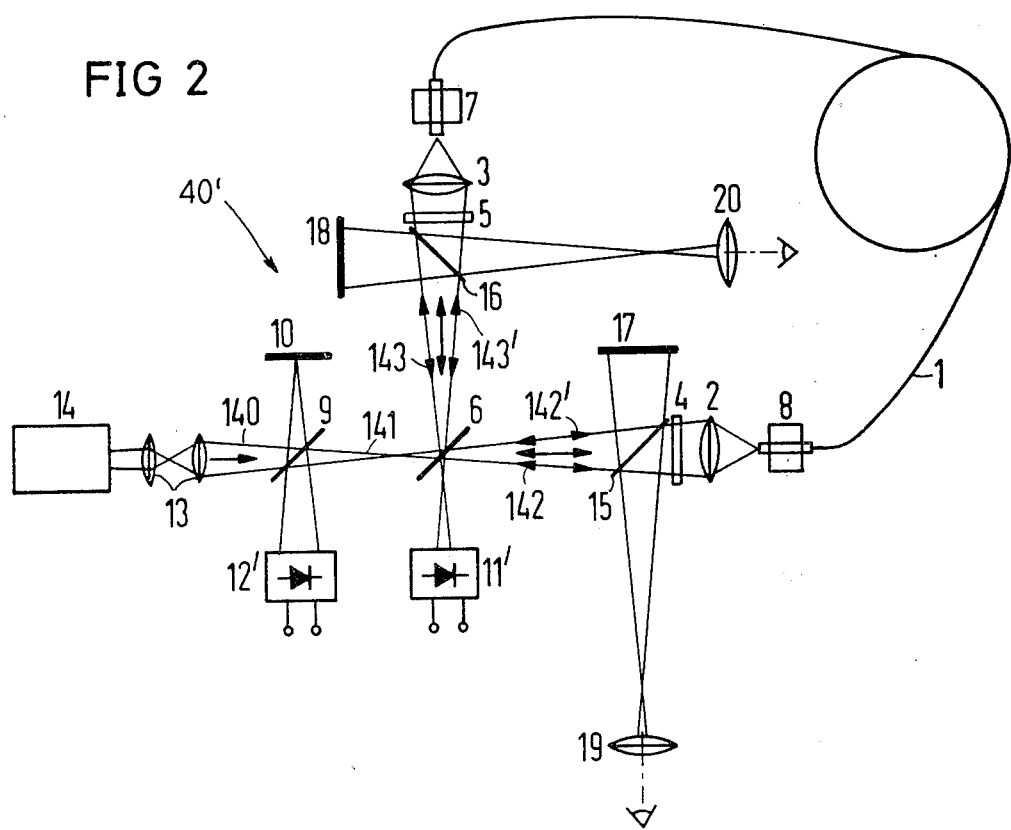
FIG. 2 is a diagrammatic view of an embodiment of an interferometer according to FIG. 1 with an installation for a magnified observation of the end surfaces of the waveguides.

In FIG. 2 an embodiment of the interferometer is generally indicated at 40' and is a complete embodiment of interferometer as is used for experiments. It is distinguished from the embodiment of the interferometer 40 of FIG. 1 essentially by means of the optical installation which includes means for providing a magnified observation of the surface for coupling in and coupling out light. This optical means or optical installation includes optical elements 15, 17 and 19 or 16, 18 and 20, respectively, for the magnified observation for the ends of the fiber. The beam dividing elements 15 and 16, which are arranged in the partial beams 142 and 143, respectively, will couple out a small part of the light of the partial beams 142 and 143, respectively. This small part of the partial beam 142 and 143 and with the help of lenses 2 and 3, respectively, enlarge purely real images of the light acceptance and light display surfaces at the ends 100 and 101 of the fiber 1, respectively, are available. These generated enlarged images can be viewed with the aid of the oculars 19 and 20, respectively. The elements 17 and 18 are arranged on the other side of the beam dividing elements or dividers 15 and 16 and are light absorbers with the light absorber 17 being associated with the ocular 19 and the beam divider 15 and the absorber 18 being associated with the beam divider 16 and the ocular 20.

In the embodiment of 40', the screens 11 and 12 have been replaced by light receiving surfaces of light sensitive elements such as photo diodes 11' and 12'. Here the interval of the lenses 2 or 3, respectively, from the light acceptance and light display surfaces of the fiber ends 100 and 101, respectively, is selected in such a manner that no circular fringe pattern occurs and this adjustment of the interval renders the use of photo diodes possible. The photo diodes, moreover, can also be used in the arrangement according to FIG. 1 in place of the screens 11 and 12.

In the interferometer 40 of FIG. 1, the parallel beams are used whereas in the interferometer 40' of FIG. 2, converging or diverging beams, respectively, are used. Thereby, it is assured that with a sharp imaging of the light acceptance and light display surfaces at the ends 100 and 101, respectively, the focal point of the light beam of the light to be coupled into the fiber in both optical devices, which light is usually a laser beam, lie on the end surfaces 100 and 101. The embodiment of the interferometer 40' of FIG. 2 allows a simple and easy adjustment of the position of the light acceptance and light display surfaces at the ends of the waveguides.

Figure 3:
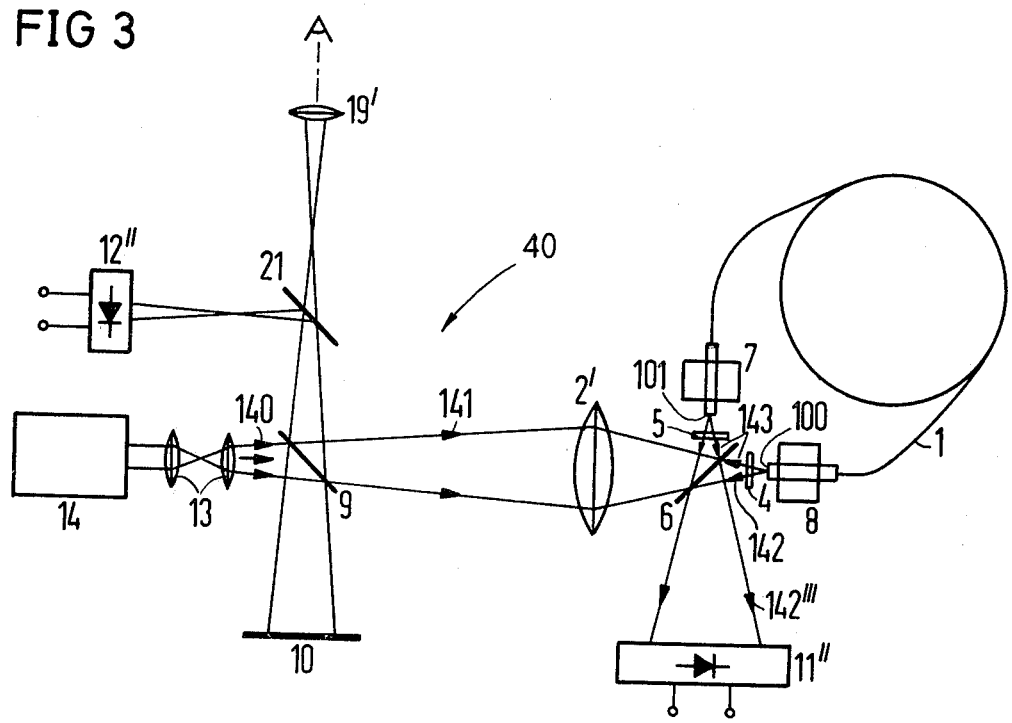
FIG. 3 is a diagrammatic view of another embodiment of an interferometer which has only one lens for purely real imaging of the light source.

Another embodiment of the interferometer is illustrated in FIG. 3 and generally indicated at 40''. The interferometer 40'' utilizes only one lens 2' and the lens system 13 as the means for the purely real imaging of the light source. Moreover, it functions with only a single installation including the beam splitter 9, a second beam splitter 21 and an ocular 19' for the magnified observation of the light acceptance and light display surfaces at the ends of the waveguide 1. The lens 2' in FIG. 3 is for the purely real imaging of the light source on or in the proximity of the light acceptance and light display surfaces at the ends of the waveguides 1. In essence, therefore, only a single lens is used here for the purely real imaging. This lens is located between the beam dividing element 6 and the light source 14. The polarization filters 4 or 5, respectively, are still arranged in the beam path of the partial beams which are generated by the beam dividing element 6 and are directed at the ends 100 and 101. A photo diode 11'' which assumes the position of the screen 11 of the interferometer 40 of FIG. 1 serves for the measurement of the circle of fringe pattern formed by the superimposed parts of partial beams 142 and 143. The position of the screen 12 illustrated in the embodiment 40 of FIG. 1 is assumed by a photo diode 12''. Between the photo diode 12'' and the additional beam dividing element 9, a further additional beam divider 21 is arranged. By means of the lens 2', the light acceptance and light display surfaces at the ends of the waveguide 1 are imaged purely real between the beam divider element 21 and the ocular 19'. By means of the ocular 19', this purely real image is magnified to be viewed by an eye. The beam divider elements are preferably expediently selected as beam divider mirrors or beam splitting cubes in such a manner that radiation with the wavelength of the light source 14, which is generally a laser, reflects well. The beam divider element 21 should transmit other spectral ranges well. Both light acceptance and light display surfaces can be magnified via the ocular 19' whereby the ends of the fiber are expediently illuminated with white light. The essential beam dividing element is expediently executed as a 50% beam dividing element. The same is also true for the additional beam divider element 9. Again, similar to FIG. 2, converging and diverging light beams, respectively, are used as light beams. The installation or the embodiment 40'' according to FIG. 3 is similar to the embodiment 40' of FIG. 2. However, the adjustment of the portion of the ends of the waveguide is somewhat more difficult since both waveguide ends are simultaneously visible in the microscope and are imaged on top of one another.

By means of the use of a suitable technology for the signal evaluation, even very small angular velocities can be determined in the embodiments 40, 40' and 40'' of FIGS. 1, 2 and 3. Hereby the fiber coil is advantageously sinusoidally turned back and forth or oscillated with an angular velocity of $\omega_w$. The signal of the photo detectors 11' and 11'', respectively, and 12' and 12'', respectively, are electrically divided. For example, the ratio of the output voltage of the photo detector 11' or 11'', respectively, and 12' and 12'', respectively, is formed. This will cancel or drop out the intensity fluctuations of the light source 14. This signal of the photo diode is multiplied by a sinusoidal signal with the oscillation frequency $\omega_w$ and the corresponding phase attitude and this combined signal is subsequently integrated over a number of periods of oscillation frequency. One can demonstrate that the voltage thus according is approximately proportional to the angular velocity of the entire construction relative to the inertial system. Angular velocities in a magnitude of 0.01% per hour can be determined wherein the shot noise of the photo diode functions as the only limitation.

At least the beam dividing element 6 and an additional beam dividing element 9 illustrated in FIGS. 1–3 can be replaced by optical directional couplers, for example, 3 dB-couplers. This leads to a significant simplification of the design of the device. The optical directional couplers have already been suggested in the technology of integrated optics and have been described in literature a number of times, for example see an article by E. A. J. Marcatili, "Dielectric Rectangular Waveguide and Directional Coupler for Integrated Optics", *The Bell System Technical Journal*, September 1969, Vol. 48, pp. 2071–2102, and P. Baues, "Integrated Optical Directional Couplers", *Elektronik-Anzeiger*, 9, 1977, pp. 19–22. Here, above all, it is a question of directional couplers, which are constructed with coupled single-mode waveguides as coupling waveguides. On principle, however, all optical directional couplers, which are built up with at least two coupling waveguides or function in the same manner are usable. On principle, optical directional coupler is to be understood as a quadripole particularly a non-reciprocal quadripole. Such a quadripole exhibits four ends which can act both as inputs and outputs. In other words, it has four surfaces for coupling or decoupling light from the fiber. As already mentioned, a simple embodiment of such an optical directional coupler exhibits two coupling waveguides whose ends exhibit light acceptance and light display surfaces and form the input and outputs, respectively, of the directional coupler. Let it be pointed out here that there are most certainly optical directional couplers with only three inputs or outputs, respectively, the fourth input or output, respectively, is then an input and output respectively which is not externally accessible.

Figure 4:
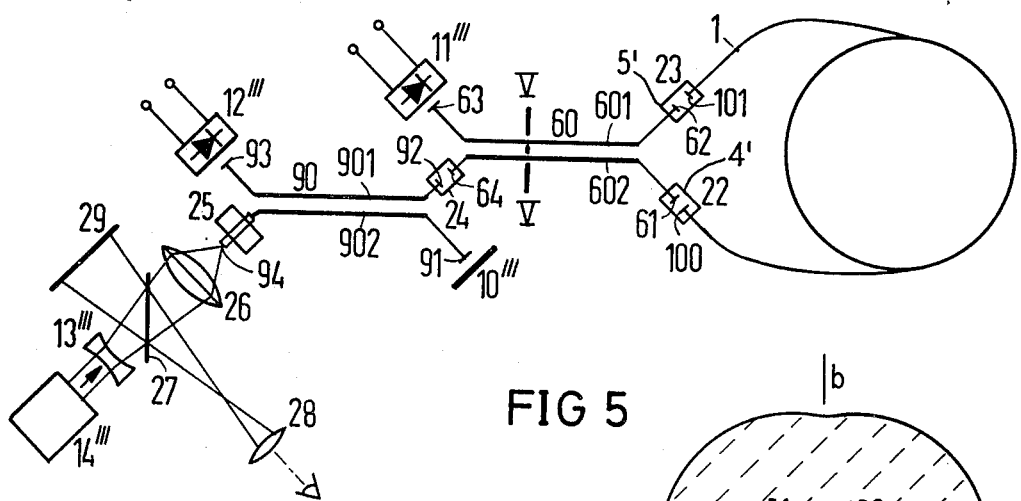
FIG. 4 is a diagrammatic view of another embodiment of the interferometer with two optical directional couplers.

In FIG. 4 the interferometer is generally indicated at 40''' and an optical directional coupler 60 is used in place of the beam dividing element 6 in the device of FIGS. 1–3, which element 6 was either a beam divider mirror or a beam splitting cube. The coupler 60 has two waveguides 601 and 602 whose ends 61–64 form four input-output ends. The input-output ends 61, 62, respectively, are individually coupled onto the light acceptance and light display surfaces of the ends 100 or 101, respectively, of the waveguide 1. The coupling is accomplished by so-called coupling plugs 22 and 23, respectively. The input-output end 63 of the coupler 60 is coupled into a photo diode 11''' which assumes the place of the screen 11 in the embodiment of FIG. 1. The fourth input-output end 64 of the coupler 60 is coupled to an input-output end 92 of an additional optical directional coupler 90 via a plug connection 24.

The additional coupler 90 has four input-output ends 91, 92, 93 and 94 which are formed by the waveguide elements 901 and 902. An input-output end 94 of the directional coupler 90 is held by a fiber holding adjusting installation 25 and light from the source 14''' is coupled into the system of couplers 90 and 60 at this end. A coupling installation consists of a collector lens 26 and a diverging lens 13''' and means for forming a purely real imaging of the light source 14'''. By means of this imaging object, the light source 14''' is imaged on the input-output end 94 of the directional coupler 90. A beam dividing element such as a divider mirror 27 is located between the divergent lens 13''' and the collector lens 26 in the beam path of the light. The beam divider mirror 27 has a light absorber 29 located on one side and an ocular 28 on the opposite side in the manner similar to the embodiments illustrated in FIGS. 1–3. The beam divider mirror 27, the lens 26 and the ocular 28 together form an optical installation for the magnified observation of the light acceptance and the light display surfaces of the waveguides. In the present case, the optical installation forms a magnified observation of the surface of end 94 of the optical directional coupler 90.

Input-output end 93 of the optical directional coupler 90 is coupled to a photo diode 12'''. A light absorber 10''' lies opposite the input-output end 91 of the directional coupler 90. Polarization filters 4' and 5', respectively, are built into the plugs 22 and 23, respectively, and are arranged between the input-output ends 61, 62 and the end surfaces 100 and 101, respectively, of the single-mode waveguide 1.

With the use of semiconductor diode lasers as the light source, it is possible to significantly simplify the coupling in installation. In addition, a single-mode plug is preferably used for each of the plugs 22, 23 and 24.

Figure 5:
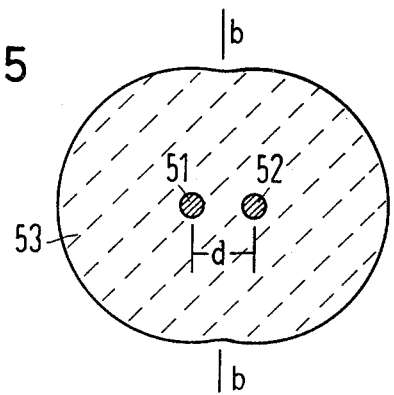
FIG. 5 is a cross section through an embodiment of an optical directional coupler taken along lines V—V of FIG. 4.

A cross section through an embodiment of the directional coupler is illustrated in FIG. 5. Directional couplers in general consist of two waveguide structures which for a segment of a specific length run next to one another with a small interval therebetween so that the coupling can occur. For the proposed interferometer 40''', directional couplers which are constructed of the same type of waveguides as the waveguide 1 are best utilized. Single-mode light guide fibers are an example. A directional coupler can be realized when cores 51 and 52 (FIG. 5) of two single-mode fibers are separated by a small interval d and surrounded by a common jacket. A proposal for the production of such a structure is disclosed in an article by B. S. Kawasaki and K. O. Hill, "Low-Loss Access Coupler for Multimode Optical Fiber Distribution Networks", *Applied Optics*, 16, July 1977, pp. 1794–1795. Although this article deals with multi-mode fibers, it proposes a coupler with two multi-mode fibers which are twisted or cabled together and welded.

The novelty, which is proposed here, is to produce a light conducting fiber, which exhibits two cores with mainly the same diameter and the same refractive index within a common jacket. Here it is proposed to produce a light conducting fiber which exhibits two cores 51 and 52 with substantially the same diameter of the magnitude of approximately 5 $\mu$m and the same refractive index within a common jacket 53. Such fibers can be produced, for example, with the help of the double crucible method with a jet or orifice for the glass melt in the outer crucible which will form the jacket and two orifices for the glass melt in the inner crucible which will form the two cores. In order to be able to couple the light into and out of the individual waveguides in a simple manner, the fiber is to be divisible along the plane bb of FIG. 5.

The length of the directional coupler for obtaining a specific coupling factor, for example 3 dB, depends in a critical matter on the mutual distance between the fiber cores. The length can be calculated according to the publication of Marcatili, which is cited hereinabove.

Although various minor modifications may be suggested by those versed in the art, it should be understood that I wish to embody within the scope of the patent granted hereon, all such modifications as reasonably and properly come within the scope of my contribution to the art.

I claim:

1. In an interferometer with an optical single-mode waveguide wound into a coil, said waveguide having a surface at each end for the acceptance of light into the waveguide and for the display of light in the waveguide, and at least one light receiving surface for receiving light emitted from said end surfaces of the waveguide, the improvements comprising at least one polarizing filter being arranged in the path of light emerging from each end surface of the waveguide prior to the light reaching the light receiving surface.

2. In an interferometer according to claim 1, wherein each of said polarizing filters is disposed in the path of a beam directed at each of the end surfaces of the waveguide.

3. In an interferometer according to claim 1, wherein said interferometer includes a light source for generating a light beam, at least one beam dividing element arranged in the path of the light beam for dividing the light beam into a pair of partial beams, means for coupling one of the partial beams into the waveguide at one of the end surfaces and for coupling the other of the pair of partial beams into the waveguide at the other end surface.

4. In an interferometer according to claim 3, wherein each of the polarizing filters associated with an end surface of the waveguide is also arranged in the beam path of the partial beam being coupled therein.

5. In an interferometer according to claim 3, wherein the light source generates at least a partially coherent light.

6. In an interferometer according to claim 5, wherein the light source comprises a laser.

7. In an interferometer according to claim 3, wherein each of said beam dividing elements is composed of a beam divider mirror.

8. In an interferometer according to claim 3, wherein each of said beam dividing elements comprises a beam splitting cube.

9. In an interferometer according to claim 3, characterized in at least one additional beam dividing element is disposed in the beam path of the light.

10. In an interferometer according to claim 9, wherein each of the beam dividing elements is selected from a group comprising of beam divider mirrors and beam splitting cubes.

11. In an interferometer according to claim 3, wherein at least one of the beam dividing elements comprises an optical directional coupler.

12. In an interferometer according to claim 3, which includes more than two beam dividing elements, at least two of the beam dividing elements being optical directional couplers having a channel of each coupler arranged in series.

13. In an interferometer according to claim 3, which includes means for purely real imaging of the light source on the light receiving surface, said means including imaging optics.

14. In an interferometer according to claim 13, wherein the means for imaging includes means for providing a magnified observation of a surface for coupling in and coupling out light.

15. In an interferometer according to claim 3, wherein the light receiving surface is a light sensitive element arranged in a position to receive a partial beam emerging from each of the end surfaces of the single-mode waveguide with said partial light beams being superimposed.

16. In an interferometer according to claim 15, wherein a beam dividing element is disposed between the light sensitive element and said end surfaces so that light from one of said end surfaces is reflected by the beam dividing element onto the light sensitive element.

17. In an interferometer according to claim 15, including an additional light sensitive element being arranged in a path to receive a superimposed image of the light emerging from the end surfaces of the waveguide, said additional light sensitive element being arranged with a beam divider mirror element so that light emerging from the end surfaces of the waveguide passes through the first mentioned beam dividing element with a portion of each emerging light being formed into a superimposed image on the first light sensitive element and the other portions of each emerging light being passed and being reflected by the first mentioned beam dividing element onto the additional light splitting element to be reflected onto the additional light sensitive element.

18. In an interferometer according to claim 15, wherein at least one of the light dividing elements comprises an optical directional coupler being disposed with at least one input-output end being coupled to the light sensitive element.

19. In an interferometer according to claim 18, wherein an additional light sensitive element is coupled by an additional optical directional coupler to an input-output end of the first mentioned optical directional coupler.

* * * * *

US004259016B1

REEXAMINATION CERTIFICATE (4107th)

United States Patent [19]
Schiffner

[11] B1 4,259,016
[45] Certificate Issued Jul. 4, 2000

[54] INTERFEROMETER WITH A SINGLE-MODE WAVEGUIDE COIL

[75] Inventor: Gerhard Schiffner, Munich, Germany

[73] Assignee: Litef GmbH, Freiburg, Germany

Reexamination Request:
No. 90/004,084, Dec. 22, 1995

Reexamination Certificate for:
Patent No.: 4,259,016
Issued: Mar. 31, 1981
Appl. No.: 06/002,615
Filed: Jan. 11, 1979

[30] Foreign Application Priority Data

Jan. 31, 1978 [DE] Germany .................................. 2804103

[51] Int. Cl.[7] .............................. G01C 19/72; G01B 9/02
[52] U.S. Cl. ........................................... 356/350; 356/351
[58] Field of Search ............................................. 356/350

[56] References Cited

U.S. PATENT DOCUMENTS

| | | | |
|---|---|---|---|
| 3,622,244 | 11/1971 | Chitayat | 356/106 |
| 4,039,260 | 8/1977 | Redman | 356/106 |
| 4,135,822 | 1/1979 | Ezekiel | 356/350 |
| 4,138,196 | 2/1979 | Redman | 356/350 |

FOREIGN PATENT DOCUMENTS

| | | |
|---|---|---|
| 1534841 | 6/1968 | France . |
| 2334967 | 7/1977 | France . |
| 2409518 | 6/1979 | France . |
| 1807247 | 5/1970 | Germany . |
| 2209397 | 9/1972 | Germany . |
| 1126744 | 9/1968 | United Kingdom . |
| 1210280 | 10/1970 | United Kingdom . |
| 1258172 | 12/1971 | United Kingdom . |
| 1345899 | 2/1974 | United Kingdom . |
| 1375091 | 11/1974 | United Kingdom . |
| 1388418 | 3/1975 | United Kingdom . |
| 1397443 | 6/1975 | United Kingdom . |

OTHER PUBLICATIONS

"Ring Interferometer 950m Long," Vali and Shorthill, *Applied Optics*, vol. 16, No. 2, Feb. 1977, p. 290.

Alekseev, E.I., et al., "Laser Interferometers Using Fiber Light Guides", *Kvantovaya Elektronika* 4, No. 9, pp. 2029–2030 (1977).

Vali, V. and Shorthill, R., "Fiber Ring Interferometer", *Applied Optics*, vol. 15, No. 5, pp. 1099–1100 (May 1976).

(List continued on next page.)

*Primary Examiner*—Samuel A. Turner

[57] ABSTRACT

An interferometer with single-mode optical waveguide wound in a coil which waveguide has a surface at each end for the acceptance of light into the waveguide and for the display of light in the waveguide characterized by at least one polarizing filter being arranged in the path of light emerging from each end surface of the waveguide. Preferably, the interferometer includes a light source such as a laser, at least one beam dividing element which is arranged in the path of a light beam and a coupling arrangement for coupling the light of one of the partial beams into one of the end surfaces and the other partial beam into the other end surface. While the interferometer utilizes a device for detecting the superimposed images of the light exiting both end surfaces of the waveguide, preferably two devices are utilized which can be either a screen or a light sensitive element such as a photo diode.

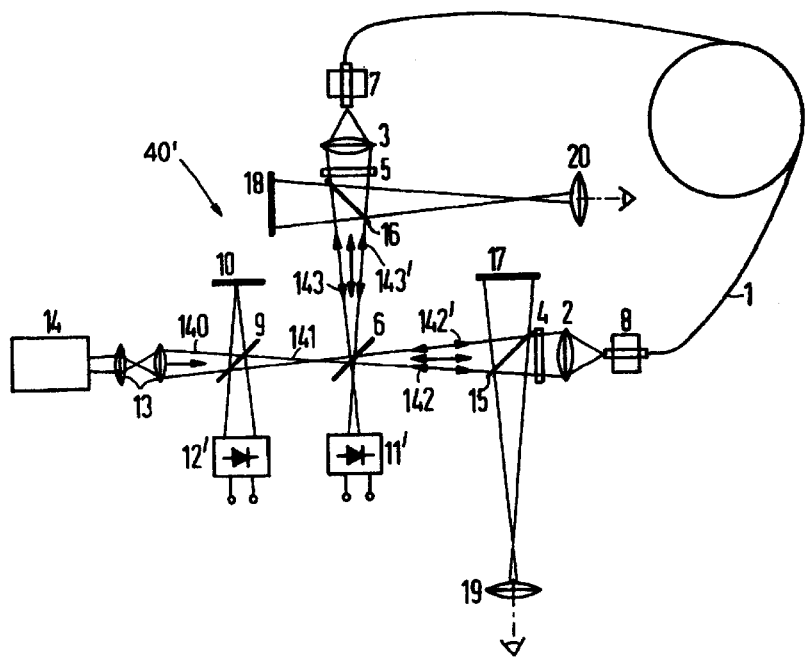

OTHER PUBLICATIONS

R. Kingslake ed., "Applied Optics and Optical Engineering", vol. IV, Optical Instruments—Section I, pp. 309–315, and particularly p. 315, lines 4–7; Section II, pp. 315–333 (Academic Press, New York and London) 1967.

B.S. Kawasaki, K.O. Hill, "Low–Loss Access Coupler for Multimode Optical Fiber Distribution Networks", *Applied Optics*, vol. 16, No. 7, pp. 1794–1795 (Jul. 1977).

E.J. Post, "Sagnac Effect", *Reviews of Modern Physics*, vol. 39, No. 2, pp. 475–493 (Apr. 1967).

E.A.J. Marcatili, "Dielectric Rectangular Waveguide and Directional Coupler for Integrated Optics", *The Bell System Technical Journal*, vol. 48, pp. 2071–2072 (Sep. 1969).

P. Baues, "Integrated Optical Directional Couplers", *Elektronik–Anzeiger*, 9, pp. 19–22 (1977) (English translation provided).

V. Vali, R.W. Shorthill, M.F. Berg, "Fresnel–Fizeau Effect in a Rotating Optical Fiber Ring Interferometer", *Applied Optics*, vol. 16, No. 10, pp. 2605–2607 (Oct. 1977).

A. Simon and R. Ulrich, "Evolution of Polarization Along a Single–Mode Fiber", *Applied Physics Letters*, vol. 31, No. 8, pp. 517–520 (Oct. 15, 1977).

F.M.E. Sladen, D. N. Payne & M.J. Adams, "Determination of Optical Fiber Refractive Index Profiles by a Near–Field Scanning Technique", *Applied Physics Letters*, vol. 28, No. 5, pp. 255–258 (Mar. 1, 1976).

H.J. Arditty, "Fiber–Optic Rotation Sensors. Bibliography", Fiber–Optic Rotation Sensors and Related Technologies, Proceedings of the First International Conference MIT, Cambridge, Mass, Nov. 9–11, 1981, pp. 27–42 (Springer–Verlag 1982).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2 and 4 is confirmed.

Claims 1, 3 and 5–19 are cancelled.

* * * * *